United States Patent
Gass et al.

(10) Patent No.: US 9,933,285 B2
(45) Date of Patent: Apr. 3, 2018

(54) PIEZOELECTRIC SENSOR ASSEMBLY, AND SENSOR ATTACHMENT ASSEMBLY AND ELECTRICAL SYSTEM EMPLOYING SAME

(71) Applicant: EATON CORPORATION, Cleveland, OH (US)

(72) Inventors: Dale Louis Gass, Brown Deer, WI (US); Jeffrey Thomas Stringer, Pittsburgh, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 320 days.

(21) Appl. No.: 14/457,625

(22) Filed: Aug. 12, 2014

(65) Prior Publication Data

US 2015/0268071 A1 Sep. 24, 2015

Related U.S. Application Data

(63) Continuation-in-part of application No. 14/221,910, filed on Mar. 21, 2014, now Pat. No. 9,326,399.

(51) Int. Cl.
 *G01D 11/24* (2006.01)
 *G01D 11/30* (2006.01)

(52) U.S. Cl.
 CPC .......... *G01D 11/245* (2013.01); *G01D 11/30* (2013.01)

(58) Field of Classification Search
 CPC .... G01D 11/245; G01D 11/30; G01D 11/305; G01D 11/24; G10K 11/004; G01R 1/04; G01P 1/02
 See application file for complete search history.

(56) References Cited

U.S. PATENT DOCUMENTS 5,426,360 A 6/1995 Maraio et al.
5,792,947 A 8/1998 Pogrebinsky et al.
(Continued)

FOREIGN PATENT DOCUMENTS

DE 26 41 047 A1 3/1978
EP 2 442 123 A2 4/2012
(Continued)

OTHER PUBLICATIONS

European Patent Office, "Invitation to Pay Additional Fees and Partial International Search Report for PCT/US2015/013401", dated Apr. 8, 2015, 8 pp.

*Primary Examiner* — Paul West
*Assistant Examiner* — Xin Zhong
(74) *Attorney, Agent, or Firm* — Eckert Seamans

(57) ABSTRACT

A piezoelectric sensor assembly is for an electrical system. The electrical system includes a sensor attachment assembly and a number of electrical conductors. The sensor attachment assembly includes a sensor housing and a fastening member for fastening the sensor housing to a corresponding one of the electrical conductors. The piezoelectric sensor assembly includes a processor enclosed by the sensor housing, a piezoelectric sensor element, a wiring assembly electrically connecting the piezoelectric sensor element to the processor, an insulating member coupled to the piezoelectric sensor element and being structured to extend outwardly from the sensor housing to engage the corresponding one of the electrical conductors, and a mounting enclosure structured to mount the piezoelectric sensor element and the insulating member to the sensor housing.

17 Claims, 7 Drawing Sheets

(56) References Cited

U.S. PATENT DOCUMENTS

| | | |
|---|---|---|
| 6,333,715 B1 | 12/2001 | Kato et al. |
| 6,518,772 B1 | 2/2003 | Milkovic et al. |
| 7,148,696 B2 | 12/2006 | Zhou et al. |
| 7,403,129 B2 | 7/2008 | Zhou et al. |
| 7,411,403 B2 | 8/2008 | Zhou |
| 7,578,172 B2 * | 8/2009 | Cho .................. G01N 33/2888 73/54.24 |
| 7,746,055 B2 | 6/2010 | Bose et al. |
| 8,665,666 B2 | 3/2014 | Zhou et al. |
| 2003/0017753 A1 | 1/2003 | Palmisano et al. |
| 2009/0141433 A1* | 6/2009 | Maloney ................ G01D 11/24 361/679.01 |
| 2010/0013457 A1 | 1/2010 | Nero, Jr. |
| 2012/0090396 A1* | 4/2012 | Zhou ..................... G01R 31/08 73/645 |
| 2012/0092020 A1 | 4/2012 | Zhou et al. |

FOREIGN PATENT DOCUMENTS

| | | |
|---|---|---|
| FR | 1 181 357 A | 6/1959 |
| WO | 01/18554 A1 | 3/2001 |

\* cited by examiner

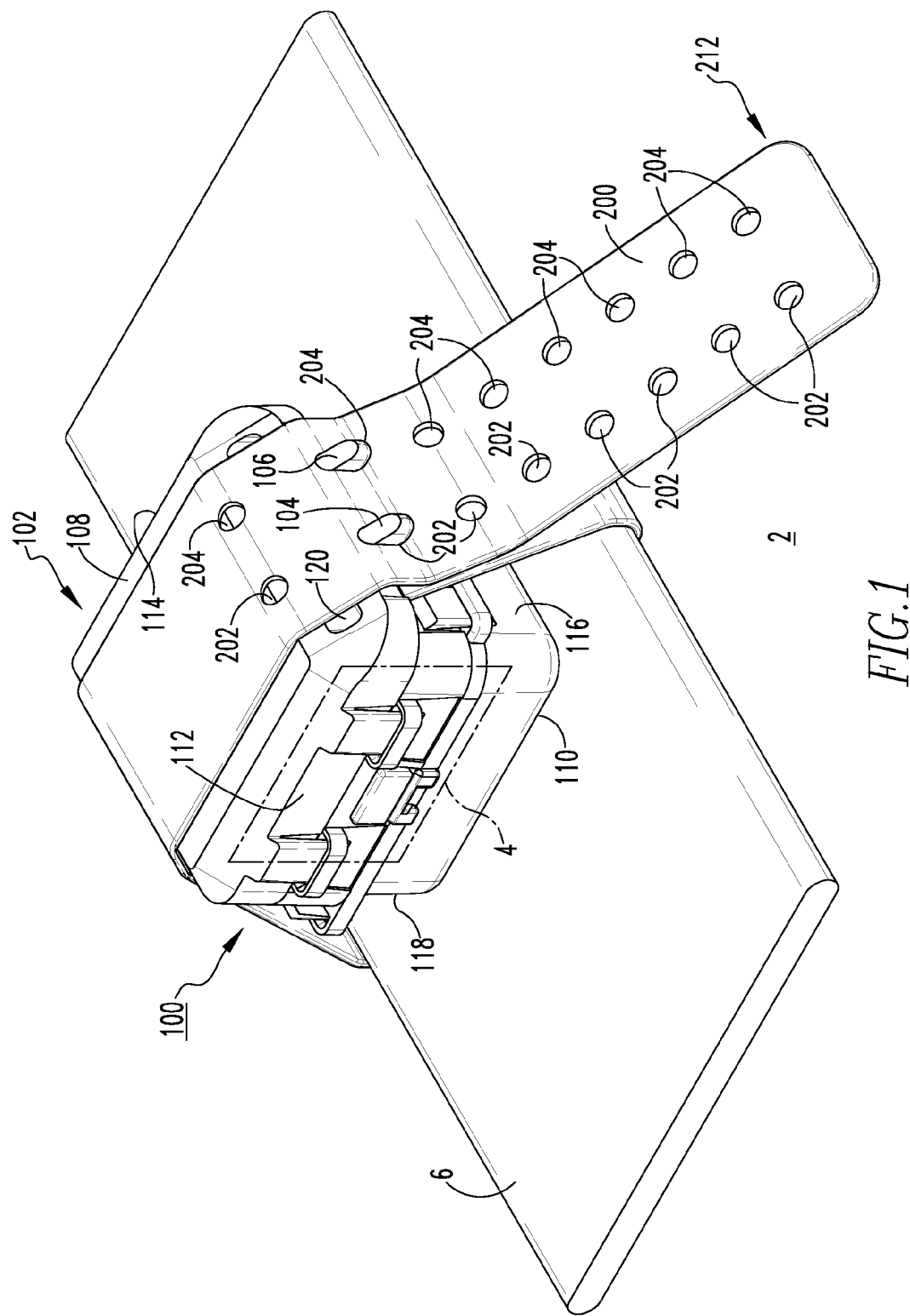

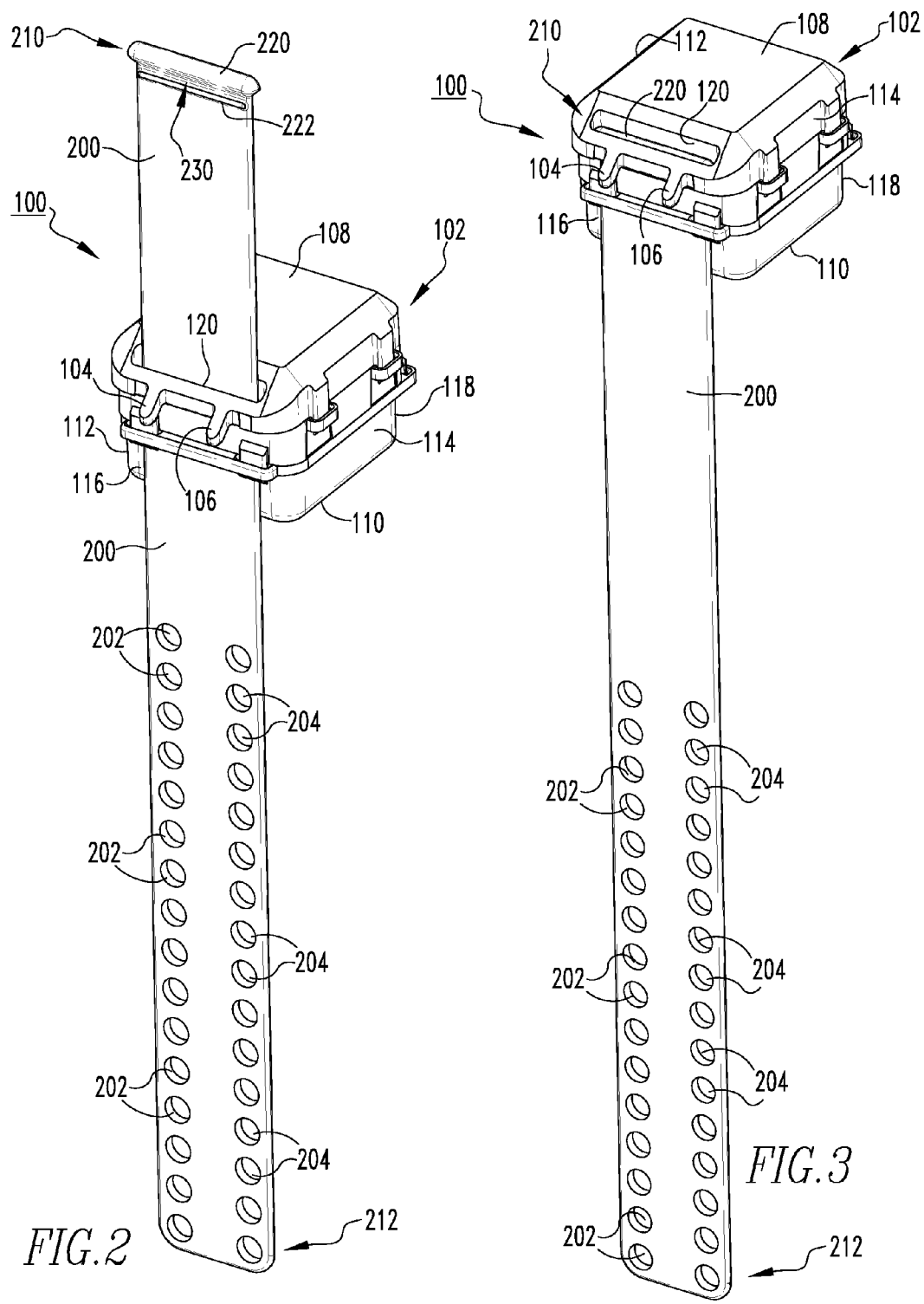

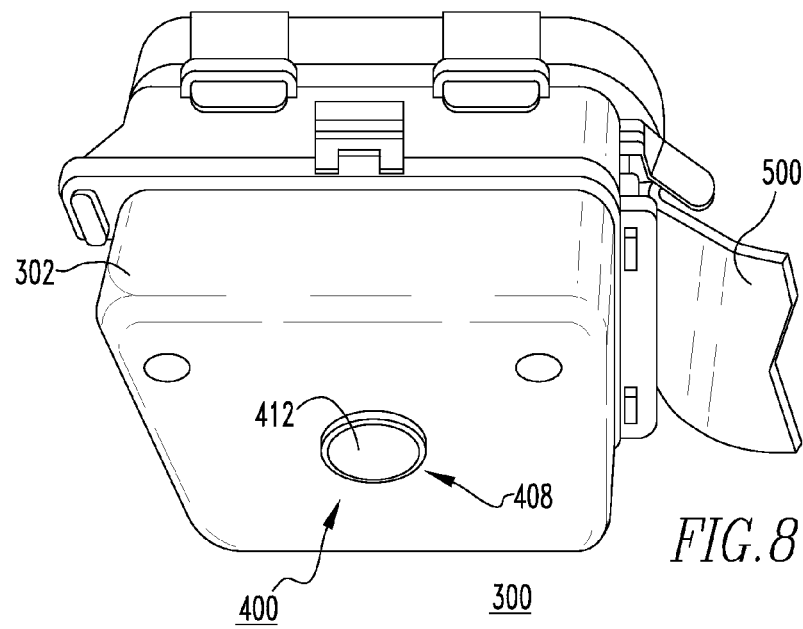
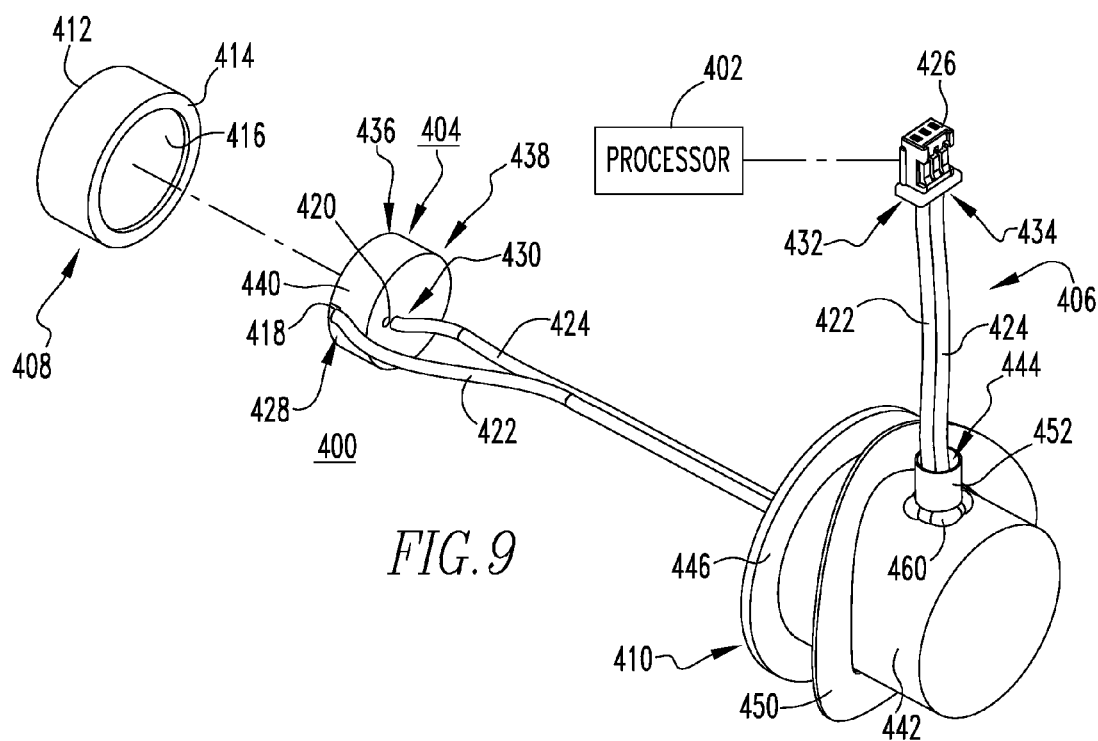

PIEZOELECTRIC SENSOR ASSEMBLY, AND SENSOR ATTACHMENT ASSEMBLY AND ELECTRICAL SYSTEM EMPLOYING SAME

CROSS-REFERENCE TO RELATED APPLICATION

This application is a continuation-in-part of U.S. patent application Ser. No. 14/221,910, filed Mar. 21, 2014, which is hereby incorporated by reference herein.

BACKGROUND

Field

The disclosed concept relates generally to sensors and, more particularly, to piezoelectric sensor assemblies. The disclosed concept also relates to sensor attachment assemblies piezoelectric sensor assemblies. The disclosed concept further relates to electrical systems employing piezoelectric sensor assemblies.

Background Information

Electrical systems often include a plurality of bus bars, and various electrical apparatus, such as electrical switching apparatus (e.g., without limitation, circuit breakers), mechanically coupled and electrically connected to the bus bars.

Some electrical systems employ sensors attached directly to the bus bars, in order to monitor various conditions within the electrical system. In low or medium voltage electrical systems, for example, attachment of such sensors to the bus bars is subject to a variety of issues or problems. It is desirable to provide for relatively quick and easy attachment of the sensors in new system applications, as well as to allow for retro-fit applications. Among other additional considerations are minimizing complexity and cost, ease of assembly and manufacture of the attachment assembly, and avoiding the attachment assembly coming loose, for example during shipment or installation. The sensor and attachment assembly must also be capable of safe and effective operation in relatively high temperature (e.g., up to 135 degrees Celsius or more bus bar temperatures) environments.

By way of example, one sensor application involves the attachment of acoustic sensors to the electrical bus bars of a low to medium voltage electrical system. One prior proposal employs a piezoelectric sensor assembly to detect acoustic signals in order to monitor the bus bars for loose connections. Among other disadvantages, known piezoelectric assemblies are relatively complex in design and employ numerous parts, including a screw assembly to pre-load the piezoelectric element. This adds to the cost and complexity and diminishes reliability. Pre-loading piezoelectric element via the screw assembly also makes it difficult to produce and repeat effective results.

There is, therefore, room for improvement in piezoelectric sensor assemblies, and in sensor attachment assemblies and electrical systems employing the same.

SUMMARY

These needs and others are met by embodiments of the disclosed concept, which are directed to a piezoelectric sensor assembly and sensor attachment assembly for electrical systems.

As one aspect of the disclosed concept a piezoelectric sensor assembly is provided for an electrical system. The electrical system includes a sensor attachment assembly and a number of electrical conductors. The sensor attachment assembly includes a sensor housing and a fastening member for fastening the sensor housing to a corresponding one of the electrical conductors. The piezoelectric sensor assembly comprises: a processor structured to be enclosed by the sensor housing; a piezoelectric sensor element; a wiring assembly electrically connecting the piezoelectric sensor element to the processor; an insulating member coupled to the piezoelectric sensor element and being structured to extend outwardly from the sensor housing to engage the corresponding one of the electrical conductors; and a mounting enclosure structured to mount the piezoelectric sensor element and the insulating member to the sensor housing.

The insulating member may be a ceramic disc. The ceramic disc may include a first side and a second side disposed opposite the first side, wherein the first side is structured to engage the corresponding one of the electrical conductors, and wherein the second side includes a recess structured to receive the piezoelectric sensor element. The piezoelectric sensor element may be adhered to the second side of the ceramic disc with a conductive adhesive (e.g., without limitation, conductive epoxy; conductive silicone-adhesive).

The piezoelectric sensor element may comprise a first electrode and a second electrode, and the wiring assembly may include a first wire, a second wire and an electrical connector. The first wire and the second wire may each include a first end and a second end, wherein the first end of the first wire is electrically connected to the first electrode and wherein the first end of the second wire is electrically connected to the second electrode. The second end of the first wire and the second end of the second wire may both be electrically connected to the electrical connector.

The mounting enclosure may be a shielding member comprising a cylindrical body, a thru hole extending through the cylindrical body, and a flange extending radially outwardly from the cylindrical body. The cylindrical body may enclose and shield the piezoelectric sensor element. The wiring assembly may extend through the thru hole. The flange may be structured to cooperate with a corresponding portion of the sensor housing. The shielding member may further comprise a curved spring or wave spring washer, wherein the curved spring or wave spring washer is structured to extend around the cylindrical body between the flange and the corresponding portion of the sensor housing.

As another aspect of the disclosed concept, a sensor attachment assembly is provided for an electrical system including a number of electrical conductors. The sensor attachment assembly comprises: a sensor housing; a fastening member structured to fasten the sensor housing to a corresponding one of the electrical conductors; and a piezoelectric sensor assembly comprising: a processor enclosed by the sensor housing, a piezoelectric sensor element, a wiring assembly electrically connecting the piezoelectric sensor element to the processor, an insulating member coupled to the piezoelectric sensor element and extending outwardly from the sensor housing to engage the corresponding one of the electrical conductors, and a mounting enclosure mounting the piezoelectric sensor element and the insulating member to the sensor housing.

As a further aspect of the disclosed concept, an electrical system comprises: a number of electrical conductors; and a sensor attachment assembly comprising: a sensor housing, a fastening member for fastening the sensor housing to a corresponding one of the electrical conductors, and a piezoelectric sensor assembly comprising: a processor enclosed by the sensor housing, a piezoelectric sensor element, a wiring assembly electrically connecting the piezoelectric sensor element to the processor, an insulating member coupled to the piezoelectric sensor element and extending outwardly from the sensor housing to engage the corresponding one of the electrical conductors, and a mounting enclosure mounting the piezoelectric sensor element and the insulating member to the sensor housing.

BRIEF DESCRIPTION OF THE DRAWINGS

A full understanding of the disclosed concept can be gained from the following description of the preferred embodiments when read in conjunction with the accompanying drawings in which:

FIG. 1 an isometric view of a portion of an electrical system and sensor attachment assembly therefor, in accordance with an embodiment of the disclosed concept;

FIGS. 2 and 3 are a isometric views of the sensor attachment assembly of FIG. 1;

FIG. 8 is an enlarged view of a portion of the sensor attachment assembly and piezoelectric sensor assembly of FIG. 7;

FIG. 9 is an isometric view of the piezoelectric sensor assembly of FIG. 8; and

DESCRIPTION OF THE PREFERRED EMBODIMENTS

For purposes of illustration of one non-limiting example embodiment of the disclosed concept, the disclosed sensor attachment assembly is described herein with respect to the attachment of acoustic sensors to the electrical bus bars of a low to medium voltage electrical system. Such acoustic sensors are described, for example and without limitation, in commonly assigned U.S. Pat. No. 8,665,666 and U.S. Patent Application Publication No. 2012/0092020, which are hereby incorporated by reference as if fully set forth herein. It will be appreciated, however, that the disclosed sensor attachment assembly could be used in a wide variety of alternative electrical systems for the suitable attachment of any known or suitable type and/or configuration of sensor or other electrical apparatus to a bus bar or other suitable electrical conductor.

As employed herein, the terms "piezo," "piezoelectric" and "piezoelectric sensor" shall be used substantially interchangeably to refer to any known or suitable device (e.g., without limitation, sensor) that uses the piezoelectric effect to measure changes in pressure, acceleration, strain and/or force by converting them to an electrical charge. For example and without limitation, a piezo disc or piezoelectric disc is a type of piezoelectric sensor that functions by generating a voltage when deformed (e.g., without limitation, depressed).

As employed herein, the term "fastener" refers to any suitable separate connecting or tightening mechanism or components expressly including, but not limited to rivets, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the statement that two or more parts are "attached" shall mean that the parts are directly joined together, without any intermediate parts.

As employed herein, the term "number" shall mean one or an integer greater than one (i.e., a plurality).

FIG. 1 shows a sensor attachment assembly 100 for an electrical system 2 (partially shown), in accordance with one non-limiting example embodiment of the disclosed concept. The electrical system 2 includes a sensor 4 (partially shown in simplified form in phantom line drawing in FIG. 1), and a number of electrical conductors such as, for example and without limitation, the single bus bar 6, shown.

Figure 4:
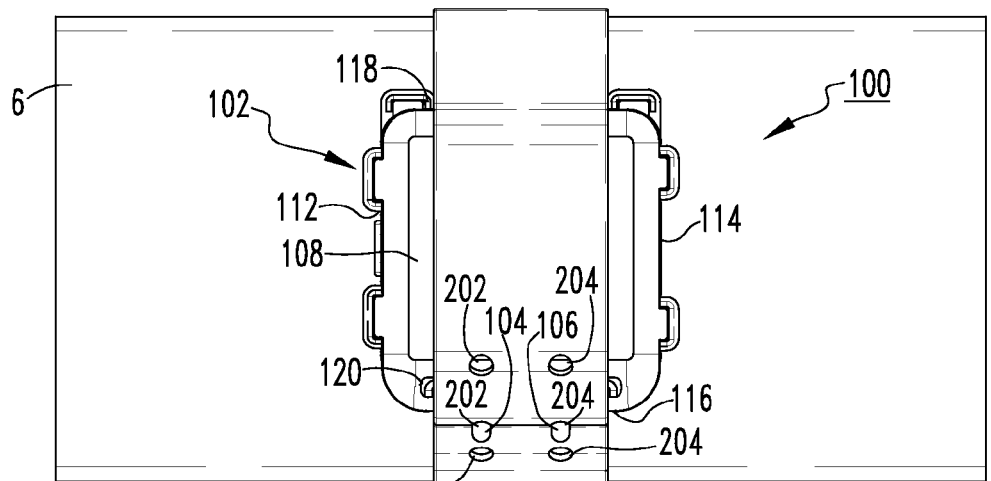
FIG. 4 is a top plan view of the portion of the electrical system and sensor attachment assembly therefor of FIG. 1.
Figure 5:
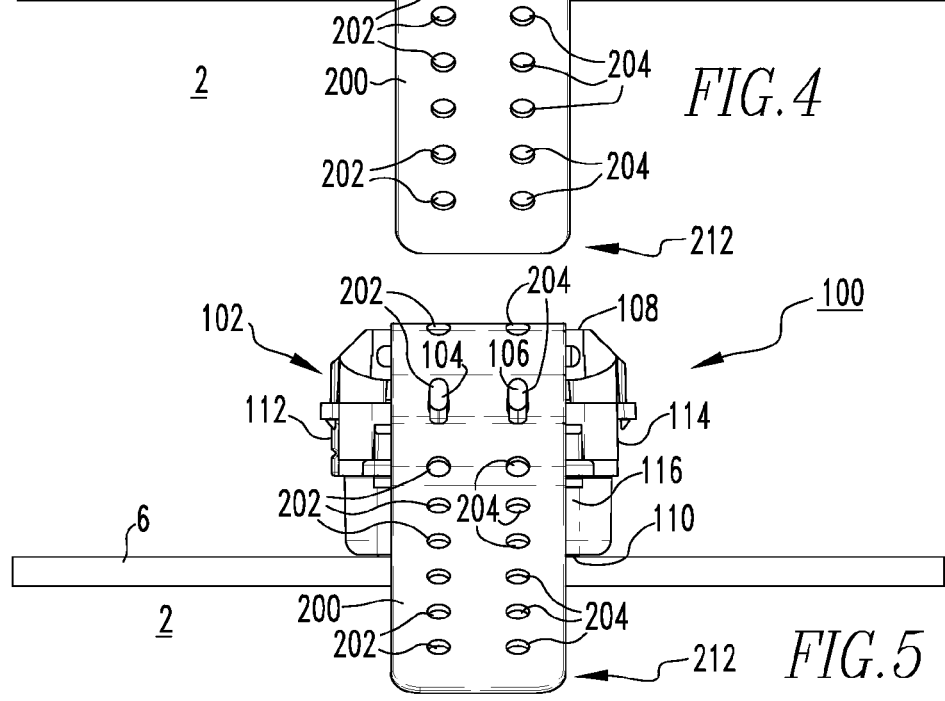
FIG. 5 is a side elevation view of the portion of the electrical system and sensor attachment assembly therefor of FIG. 4.

The sensor attachment assembly 100 includes a sensor housing 102 structured to at least partially enclose the sensor 4 (FIG. 1), and a fastening member 200 coupled to the sensor housing 102. The example fastening member is an elongated strap 200, which is structured to extend from one portion of the sensor housing 102 around the corresponding electrical conductor (e.g., without limitation, bus bar 6 (partially shown)), and to attach to another portion of the sensor housing 102, in order to removably attach the sensor 4 to the bus bar 6. In other words, the elongated strap 200 wraps around the bus bar 6 and reattaches to the sensor housing 102, as shown in FIG. 1 (see also FIGS. 4-6).

The elongated strap 200 is adjustable among the plurality of predetermined positions with respect to the sensor housing 102. Such adjustability is provided, for example and without limitation, by way of a plurality of holes 202,204 disposed in the elongated strap 200, as shown. The sensor housing 102 includes a number of corresponding protrusions, adapted to cooperate with the holes 202,204. In the example shown, the protrusions are a pair of pegs 104,106. Each peg 104,106 is structured to extend into and be disposed within a corresponding one of the holes 202,204 to removably secure the elongated strap 200 in a desired one of the predetermined positions. More specifically, the plurality of holes preferably comprises two parallel rows of holes 202,204 extending along the length of the elongated strap 200, as shown. The pegs 104,106 extend outwardly from the sensor housing 102, and are disposed within a desired pair of parallel holes 202,204 (see, for example, FIGS. 1 and 4-6). In this manner, the sensor attachment assembly 100 can accommodate, for example, different widths and/or depths of bus bars (e.g., 6) or other suitable electrical conductors (not shown). It will, however, be appreciated that any known or suitable alternative number, type and/or configuration (not shown) of protrusions and holes other than the pair of pegs 104,106 and parallel rows of holes 202,204 could be employed, without departing from the scope of the disclosed concept.

In the example shown and described herein, the sensor housing 102 includes a top 108, a bottom 110 disposed opposite the top 108, a first side 112, a second side 114 disposed opposite the first 112, a first end 116, and a second end 118 disposed opposite the first end 116. The pegs 104,106 are shown extending outwardly from the first end 116 of the sensor housing 102. It will be appreciated, however, that the pegs 104,106 could alternatively be located on the top 108 of the sensor housing 102, or in any other known or suitable location (not shown).

Referring to FIGS. 2 and 3, the first end 116 of the sensor housing 102 also includes a slot 120. The example elongated strap 200 includes a first end 210 and second end 212 disposed opposite and distal from the first end 210. The first end 210 has an enlarged lip portion 220, as shown. The enlarged lip portion 220 is structured to engage the sensor housing 102 at or about the slot 120 to prevent the elongated strap 200 from undesirably detaching from the sensor housing 102. That is, the first end 212 of the elongated strap 200 is inserted through the slot 120 and the strap 200 is adjusted with respect to the sensor housing 102 until it is in the final position, shown in FIG. 3.

The elongated strap 200 preferably further includes a rib 222, which is disposed proximate to but spaced a predetermined distance 230 from the enlarged lip portion 220, as best shown in FIG. 2. The rib 222 and enlarged lip portion 220 are structured to cooperate with the sensor housing 102 to maintain the elongated strap 200 in a desired position with respect to the sensor housing 102.

Stated another way, the enlarged lip portion 220 serves to keep the elongated strap 200 from detaching from the sensor housing 102 in the pull-through direction, while the rib 222, in combination with the enlarged lip portion 220 (and space 230 therebetween), serves to keep the elongated strap 200 from detaching from the sensor housing 102, or undesirably sliding in the opposite direction. The rib 222, therefore, keeps the elongated strap 200 from becoming loose, for example and without limitation, in shipment and/or during installation.

Figure 6:
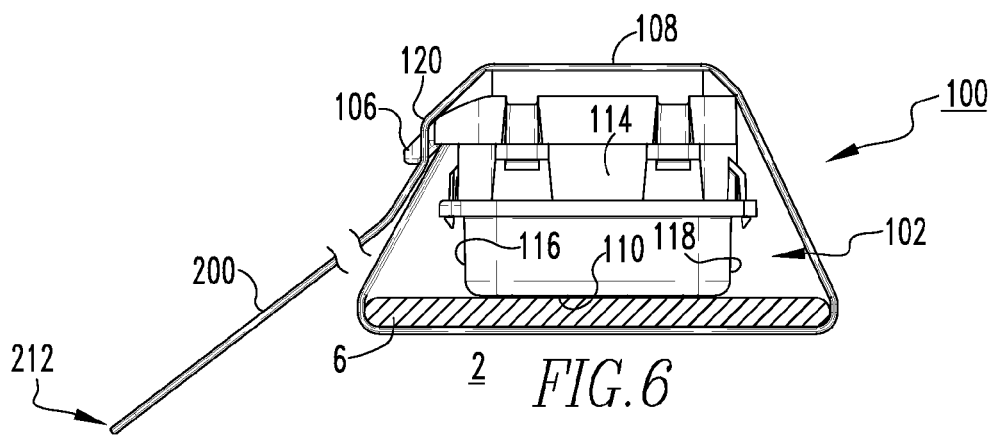
FIG. 6 is an end elevation, partially in section view of the portion of the electrical system and sensor attachment assembly therefor of FIG. 5.
Figure 7:
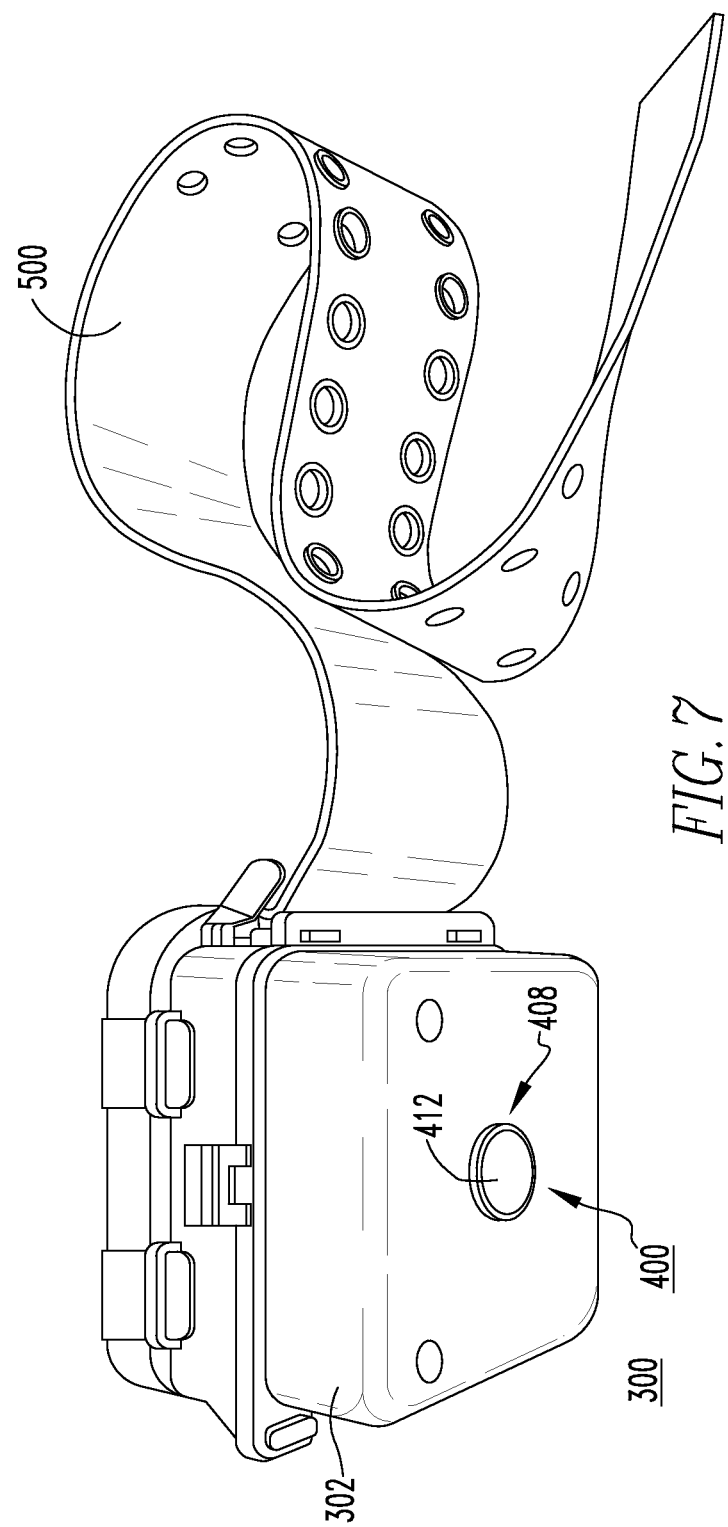
FIG. 7 is an isometric view of a sensor attachment assembly employing a piezoelectric sensor assembly, in accordance with an embodiment of the disclosed concept.

The elongated strap 200 is preferably made from a resilient material such as, for example and without limitation, silicone rubber. Such material allows for relatively quick and easy installation since the silicone rubber simply stretches around the bus bar 6 onto the sensor housing 102. The design also allows for retro-fit applications, and ease of assembly and manufacture of the sensor attachment assembly 100. The resilient nature of the elongated strap 200, in combination with the aforementioned adjustability thereof, also serves to ensure the secure attachment of the sensor 4 (FIG. 1) to bus bar 6, as shown in FIGS. 1 and 4-6. That is, in operation, the elongated strap 200 wraps around the bus bar 6 and attaches to the sensor housing 102, as best shown in FIG. 6. More specifically, the bottom 110 of the sensor housing 102 is structured to engage the bus bar 6, and the elongated strap 200 is structured to extend through the aforementioned slot 120 in the sensor housing 102, around the bus bar 6, and over the top 108 of the sensor housing 102. The elongated strap 200 is then fastened to the sensor housing 102 using the aforementioned pegs 104,106 within corresponding holes 202,204 of the elongated strap 200. As also shown in FIG. 6, once the elongated strap 200 has been suitably adjusted to secure the sensor attachment assembly 100 to the bus bar 6, as desired, the elongated strap 200 can optionally be cut to the desired length. That is, the elongated strap 200 can be cut and any excess length can be removed.

Among other benefits, the sensor attachment assembly 100 is suitable for use in relatively high temperature environments (e.g., without limitation, 135 degrees C. bus bar temperatures; 65 degrees C. ambient), and no modification of the bus bar 6 or other electrical conductor (not shown) is required. For example and without limitation, it is not necessary to drill any holes in the bus bar 6 or make any other modifications in order to attach the sensor 4 (FIG. 1) using the sensor attachment assembly 100, in accordance with the disclosed concept. The adjustable resilient elongated strap 200 of the sensor attachment assembly also advantageously securely attaches the sensor (e.g., 4), without requiring the use of any separate fasteners.

Accordingly, it will be appreciated that the disclosed sensor attachment assembly 100 provides for a relatively low-profile design for relatively easily and quickly securely attaching a sensor 4 (FIG. 1) to a wide variety of different corresponding electrical conductors (e.g., without limitation, bus bar 6).

FIGS. 7-11 show one specific, but non-limiting example embodiment of a sensor attachment assembly 300 (FIGS. 7, 8, 10 and 11) for an electrical system 2' (FIGS. 10 and 11), which employs a piezoelectric sensor assembly 400 for detecting loose connections in the electrical system 2'. Like sensor attachment assembly 100 discussed hereinabove with respect to FIGS. 1-6, sensor attachment assembly 300 includes a sensor housing 302 (FIGS. 7 and 8; also shown in section view in FIGS. 10 and 11) and a fastening member 500 substantially similar to the aforementioned elongated strap 200 discussed above with respect to FIGS. 1-6. The fastening member 500 fastens the sensor housing 302 to a corresponding electrical conductor 6' (e.g., without limitation, bus bar 6' of FIGS. 10 and 11) in substantially the same manner discussed hereinabove.

Figure 10:
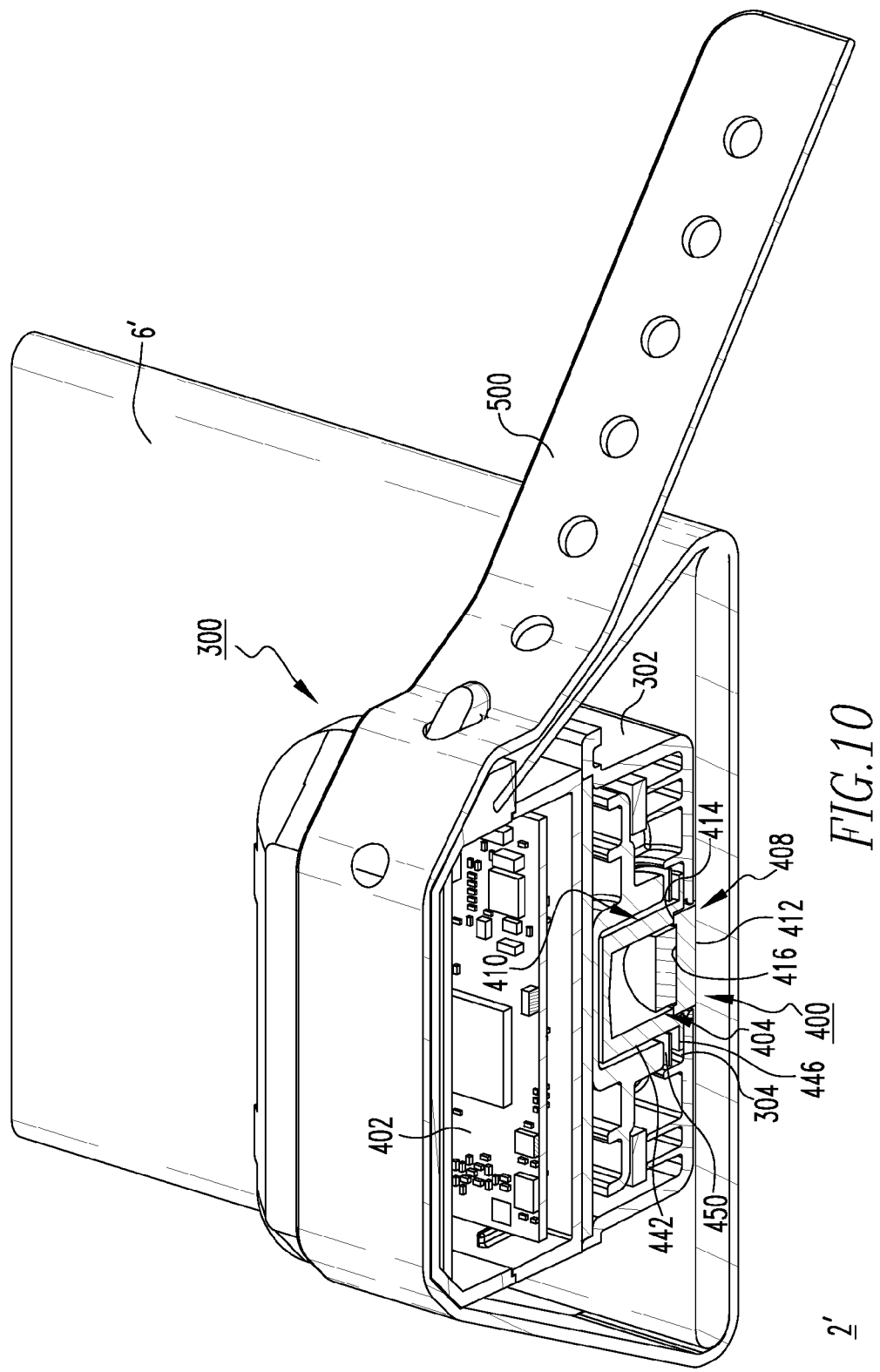
FIGS. 10 and 11 are isometric section and elevation section views, respectively, of a portion of an electrical system employing the sensor attachment assembly and piezoelectric sensor assembly therefor of FIG. 7.
Figure 11:
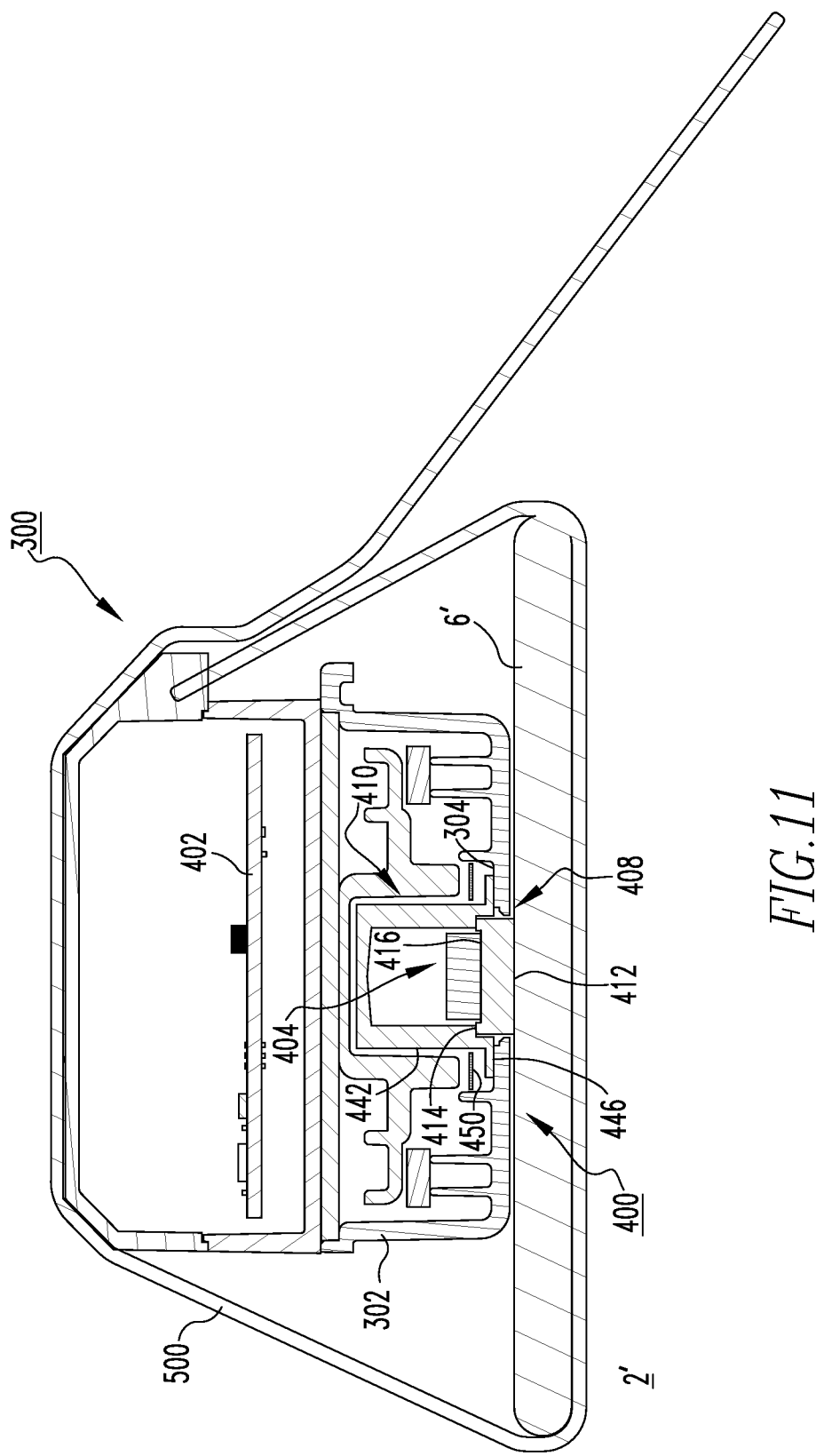

As best shown in FIG. 9, the example piezoelectric sensor assembly 400 includes a processor 402 (shown in simplified form in FIG. 9; see also, for example and without limitation, printed circuit board (PCB) 402 partially shown in FIGS. 10 and 11), which is structured to be enclosed by the sensor housing 302, as shown in FIGS. 10 and 11. The piezoelectric sensor assembly 400 further includes a piezoelectric sensor element 404, a wiring assembly 406 for electrically connecting the piezoelectric sensor element 404 to the processor 402, an insulating member 408 coupled to the piezoelectric sensor element 404, and a mounting enclosure 410 structured to mount the piezoelectric sensor element 404 and the insulating member 408 to the sensor housing 302, as best shown in the section views of FIGS. 10 and 11. The wiring assembly 406 in the example shown is unshielded. It will be appreciated, however, that shielded cable (not shown) could be employed, without departing from the scope of the disclosed concept.

The insulating member 408 is structured to extend outwardly from the sensor housing 302 to engage the corresponding bus bar 6', as shown in FIGS. 10 and 11. In the example shown and described herein, the insulating member is a ceramic disc 408 having first and second opposing sides 412,414. The first side 412 engages the corresponding bus bar 6', and the second side 414 includes a recess 416 structured to receive the piezoelectric sensor element 404. The piezoelectric sensor element 404 is preferably adhered to the second side 414 of the ceramic disc 408 with a suitable conductive adhesive (e.g., without limitation, conductive epoxy; conductive silicone adhesive). Accordingly, among other benefits, the disclosed piezoelectric sensor assembly 400 has a reduced part count, by eliminating the requirement for separate fasteners (e.g., without limitation, screws).

Accordingly, the refined design of the disclosed piezoelectric sensor assembly 400 not only has a reduced complexity and corresponding lower cost, but also has improved reliability and repeatability. For example and without limitation, by eliminating the screw required to pre-load the piezo element of prior art designs (not shown), a larger piezoelectric sensor element 404 can be employed in the same amount of space, thereby advantageously increasing sensitivity. The disclosed design also includes only one acoustic interface between the bus bar 6' (FIGS. 10 and 11)

and the piezoelectric sensor element 404 and, more specifically, the insulating member 408 thereof, thereby further increasing sensitivity.

It will be appreciated that the conductive adhesive serves the further advantageous purpose of creating a shield around the piezoelectric element 404, thereby minimizing undesirable electrical noise. In addition to the conductive adhesive, it will be appreciated that a conductive spray coating (e.g., without limitation, nickel or other metal or conductive spray coating or shield) could be applied to the area where the piezoelectric sensor element 404 is disposed. Metal plating of the insulating member 408 (e.g., without limitation, ceramic disc 408) is another foreseeable alternative for providing the desired shielding properties.

The piezoelectric sensor element 404 of the example piezoelectric sensor assembly 400 is a cylindrical disc 404 including a first electrode 418 and a second electrode 420. The wiring assembly 406 includes a first wire 422, a second wire 424, and an electrical connector 426. The first end 428 of the first wire 422 is electrically connected to the first electrode 418, the first end 430 of the second wire 424 is electrically connected to the second electrode 420, and the second ends 432,434 of the first and second wires 422,424, respectively, are both electrically connected to the electrical connector 426. The cylindrical disc 404 further includes first and second opposing ends 436,438 and a sidewall 440 extending therebetween. As shown in FIG. 9, the first electrode 418 is disposed on the sidewall 440 proximate to the first end 436 of the cylindrical disk 404, and the second electrode 420 is disposed on the second end 438 of the cylindrical disc 404. As previously mentioned hereinabove, the example processor 402 (shown in simplified form in FIG. 9) is a printed circuit board (PCB) 402 (also partially shown in section view in FIGS. 10 and 11). The aforementioned electrical connector 426 of the wiring assembly 406 is adapted to suitably electrically connect the piezoelectric sensor element 404 to the PCB 402. As noted above, the example wiring assembly 406 shown and described herein is unshielded, but suitable shielded cable (not shown) could be alternatively employed.

Continuing to refer to FIG. 9, and also to FIGS. 10 and 11, the example mounting enclosure is a shielding member 410 having a cylindrical body 442, a thru hole 444 extending through a cylindrical body 442, and a flange 446 extending radially outwardly from the cylindrical body 442. The cylindrical body 442 encloses and shields the piezoelectric sensor element 404, as best shown in the section views of FIGS. 10 and 11. For example and without limitation, the shielding member 410 is preferably made from a material (e.g., without limitation, stainless steel) having the desired material properties (e.g., without limitation, electrical shielding capabilities). The wiring assembly 406, in particular first and second wires 422,424 thereof, extend through the thru hole 444 of the cylindrical body 442, as shown in FIG. 9. In the example of FIG. 9, the shielding member 410 further includes a sleeve 452 suitably secured (e.g., without limitation, adhered by epoxy 460) to the cylindrical body 442 at or about the thru hole 444. The sleeve 452 functions to support and thereby reduce stress on the wires 422,424 of the wiring assembly 406 that could otherwise be caused by the edges of the thru hole 444.

As shown in FIGS. 10 and 11, the flange 446 is structured to cooperate with a corresponding portion 304 of the sensor housing 302. The shielding member 410 of the example piezoelectric sensor assembly 400 further includes a curved spring or wave spring washer 450 (best shown in FIG. 9), which is structured to extend around the cylindrical body 442 between the flange 446 and the corresponding portion 304 of the sensor housing 302. The curved spring or wave spring washer 450 functions to spring load the piezoelectric sensor assembly 400, as desired, for example and without limitation, to maintain the acoustic interface between the piezoelectric sensor assembly 400 and corresponding bus bar 6'.

Accordingly, the disclosed piezoelectric sensor assembly 400 and sensor attachment assembly 300 therefor provide an efficient and effective mechanism for monitoring electrical conductors (e.g., without limitation, bus bar 6') of electrical systems (e.g., without limitation, 2') for loose connections. The improved piezoelectric sensor assembly design effectively detects (i.e., senses) acoustic signals while reducing the number of components, complexity and associated cost, and also improving reliability, repeatability and sensitivity over prior art piezoelectric sensor assembly designs (not shown).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A piezoelectric sensor assembly for an electrical system, said electrical system comprising a sensor attachment assembly and a number of electrical conductors, said sensor attachment assembly comprising a sensor housing and a fastening member for fastening the sensor housing to a corresponding one of said electrical conductors, said corresponding one of said electrical conductors having a first side and a second side disposed opposite the first side, said piezoelectric sensor assembly comprising:
   a processor structured to be enclosed by the sensor housing;
   a piezoelectric sensor element;
   a wiring assembly electrically connecting said piezoelectric sensor element to said processor;
   an insulating member coupled to said piezoelectric sensor element and being structured to extend outwardly from the sensor housing to engage the first side of said corresponding one of said electrical conductors, wherein said insulating member is a ceramic disc; wherein said ceramic disc includes a first side and a second side disposed opposite the first side; wherein the first side of said ceramic disc is structured to engage the first side of said corresponding one of said electrical conductors; and wherein the second side of said ceramic disc includes a recess structured to receive said piezoelectric sensor element; and
   a mounting enclosure structured to mount said piezoelectric sensor element and said insulating member to the sensor housing,
   wherein said fastening member comprises an elongated strap disposed on the exterior of the sensor housing and structured to wrap around and engage the second side of said corresponding one of said electrical conductors and attach to the sensor housing, in order to secure said piezoelectric sensor assembly to the first side of said corresponding one of said electrical conductors without requiring a separate mounting or clamping member on the second side.

2. The piezoelectric sensor assembly of claim 1 wherein said piezoelectric sensor element is adhered to the second side of said ceramic disc with a conductive adhesive.

3. The piezoelectric sensor assembly of claim 1 wherein said piezoelectric sensor element comprises a first electrode and a second electrode; wherein said wiring assembly includes a first wire, a second wire and an electrical connector; wherein said first wire and said second wire each include a first end and a second end; wherein the first end of said first wire is electrically connected to said first electrode; wherein the first end of said second wire is electrically connected to said second electrode; and wherein the second end of said first wire and the second end of said second wire are both electrically connected to said electrical connector.

4. The piezoelectric sensor assembly of claim 3 wherein said piezoelectric sensor element is a cylindrical disc; wherein said cylindrical disc further comprises a first end, a second end disposed opposite the first end of said cylindrical disc, and a sidewall extending therebetween; wherein said first electrode is disposed on the sidewall proximate to the first end of said cylindrical disc; and wherein said second electrode is disposed on the second end of said cylindrical disc.

5. The piezoelectric sensor assembly of claim 3 wherein said processor is a printed circuit board; and wherein said electrical connector electrically connects said piezoelectric sensor element to said printed circuit board.

6. The piezoelectric sensor assembly of claim 1 wherein said mounting enclosure is a shielding member comprising a cylindrical body, a thru hole extending through said cylindrical body, and a flange extending radially outwardly from said cylindrical body; wherein said cylindrical body encloses and shields said piezoelectric sensor element; wherein said wiring assembly extends through said thru hole; and wherein said flange is structured to cooperate with a corresponding portion of the sensor housing.

7. The piezoelectric sensor assembly of claim 6 wherein said shielding member further comprises a curved spring or wave spring washer; and wherein said curved spring or wave spring washer is structured to extend around said cylindrical body between said flange and said corresponding portion of the sensor housing.

8. A sensor attachment assembly for an electrical system including a number of electrical conductors, said sensor attachment assembly comprising:
a sensor housing;
a fastening member structured to fasten the sensor housing to a corresponding one of said electrical conductors, said corresponding one of said electrical conductors including a first side and a second side disposed opposite the first side; and
a piezoelectric sensor assembly comprising:
a processor enclosed by the sensor housing,
a piezoelectric sensor element,
a wiring assembly electrically connecting said piezoelectric sensor element to said processor,
an insulating member coupled to said piezoelectric sensor element and extending outwardly from the sensor housing to engage the first side of said corresponding one of said electrical conductors, wherein said insulating member is a ceramic disc; wherein said ceramic disc includes a first side and a second side disposed opposite the first side; wherein the first side of said ceramic disc is structured to engage the first side of said corresponding one of said electrical conductors; and wherein the second side of said ceramic disc includes a recess structured to receive said piezoelectric sensor element, and
a mounting enclosure mounting said piezoelectric sensor element and said insulating member to the sensor housing,
wherein said fastening member comprises an elongated strap disposed on the exterior of the sensor housing and structured to wrap around and engage the second side of said corresponding one of said electrical conductors and attach to the sensor housing, in order to secure said piezoelectric sensor assembly to the first side of said corresponding one of said electrical conductors without requiring a separate mounting or clamping member on the second side.

9. The sensor attachment assembly of claim 8 wherein said piezoelectric sensor element comprises a first electrode and a second electrode; wherein said wiring assembly includes a first wire, a second wire and an electrical connector; wherein said first wire and said second wire each include a first end and a second end; wherein the first end of said first wire is electrically connected to said first electrode; wherein the first end of said second wire is electrically connected to said second electrode; and wherein the second end of said first wire and the second end of said second wire are both electrically connected to said electrical connector.

10. The sensor attachment assembly of claim 9 wherein said piezoelectric sensor element is a cylindrical disc; wherein said cylindrical disc further comprises a first end, a second end disposed opposite the first end of said cylindrical disc, and a sidewall extending therebetween; wherein said first electrode is disposed on the sidewall proximate to the first end of said cylindrical disc; and wherein said second electrode is disposed on the second end of said cylindrical disc.

11. The sensor attachment assembly of claim 9 wherein said processor is a printed circuit board; and wherein said electrical connector electrically connects said piezoelectric sensor element to said printed circuit board.

12. The sensor attachment assembly of claim 8 wherein said mounting enclosure is a shielding member comprising a cylindrical body, a thru hole extending through said cylindrical body, and a flange extending radially outwardly from said cylindrical body; wherein said cylindrical body encloses and shields said piezoelectric sensor element; wherein said wiring assembly extends through said thru hole; and wherein said flange cooperates with a corresponding portion of the sensor housing.

13. The sensor attachment assembly of claim 12 wherein said shielding member further comprises a curved spring or wave spring washer; and wherein said curved spring or wave spring washer extends around said cylindrical body between said flange and said corresponding portion of the sensor housing.

14. An electrical system comprising:
a number of electrical conductors; and
a sensor attachment assembly comprising:
a sensor housing,
a fastening member for fastening the sensor housing to a corresponding one of said electrical conductors, said corresponding one of said electrical conductors including a first side and a second side disposed opposite the first side, and
a piezoelectric sensor assembly comprising:
a processor enclosed by the sensor housing,
a piezoelectric sensor element,
a wiring assembly electrically connecting said piezoelectric sensor element to said processor, an insulating member coupled to said piezoelectric sensor element and extending outwardly from the sensor housing to engage the first side of said corresponding one of said electrical conductors, wherein said insulating member is a ceramic disc; wherein said ceramic disc includes a first side and a second side disposed opposite the first side; wherein the first side of said ceramic disc is structured to engage the first side of said corresponding one of said electrical conductors; and wherein the second side of said ceramic disc includes a recess structured to receive said piezoelectric sensor element, and a mounting enclosure mounting said piezoelectric sensor element and said insulating member to the sensor housing, wherein said fastening member comprises an elongated strap disposed on the exterior of the sensor housing and structured to wrap around and engage the second side of said corresponding one of said electrical conductors and attach to the sensor housing, in order to secure said piezoelectric sensor assembly to the first side of said corresponding one of said electrical conductors without requiring a separate mounting or clamping member on the second side.

15. The electrical system of claim 14 wherein said piezoelectric sensor element comprises a first electrode and a second electrode; wherein said wiring assembly includes a first wire, a second wire and an electrical connector; wherein said first wire and said second wire each include a first end and a second end; wherein the first end of said first wire is electrically connected to said first electrode; wherein the first end of said second wire is electrically connected to said second electrode; and wherein the second end of said first wire and the second end of said second wire are both electrically connected to said electrical connector.

16. The electrical system of claim 15 wherein said piezoelectric sensor element is a cylindrical disc; wherein said cylindrical disc further comprises a first end, a second end disposed opposite the first end of said cylindrical disc, and a sidewall extending therebetween; wherein said first electrode is disposed on the sidewall proximate to the first end of said cylindrical disc; wherein said second electrode is disposed on the second end of said cylindrical disc; wherein said processor is a printed circuit board; and wherein said electrical connector electrically connects said piezoelectric sensor element to said printed circuit board.

17. The electrical system of claim 14 wherein said mounting enclosure is a shielding member comprising a cylindrical body, a thru hole extending through said cylindrical body, a flange extending radially outwardly from said cylindrical body, and a curved spring or wave spring washer; wherein said cylindrical body encloses and shields said piezoelectric sensor element; wherein said wiring assembly extends through said thru hole; wherein said flange cooperates with a corresponding portion of the sensor housing; and wherein said curved spring or wave spring washer extends around said cylindrical body between said flange and said corresponding portion of the sensor housing.

* * * * *